United States Patent [19]

Hansen

[11] Patent Number: 4,528,484
[45] Date of Patent: Jul. 9, 1985

[54] ELECTRONICALLY CONTROLLED MOTOR ASSEMBLY

[76] Inventor: Thomas C. Hansen, 1115 Sir Francis Drake Blvd., Apt. 16, Kentfield, Calif. 94904

[21] Appl. No.: 467,137

[22] Filed: Feb. 16, 1983

Related U.S. Application Data

[63] Continuation-in-part of Ser. No. 417,222, Sep. 13, 1982.

[51] Int. Cl.³ .............................................. H02P 7/06
[52] U.S. Cl. ..................................... 318/135; 310/13; 360/106
[58] Field of Search .......................... 310/13, DIG. 6; 318/135; 360/106

[56] References Cited

U.S. PATENT DOCUMENTS 3,758,845  9/1973  MacKelvie ........................... 336/120
3,924,146 12/1975  George .................................. 310/12

OTHER PUBLICATIONS

Published U.S. Appl. Ser. No. 324,939, filed Mar. 20, 1940, publ. May 18, 1943, to Stoljian.
Benton et al., "Printed Circuit Winding for Concentric Transformer", vol. 18, No. 1, p. 47, Jun. 1975.

Primary Examiner—William H. Beha, Jr.
Attorney, Agent, or Firm—Flehr, Hohbach, Test, Albritton & Herbert

[57] ABSTRACT

Electronically controlled motor assembly particularly suitable for use in precise positioning applications such as positioning the transducer head in a disk drive system. The motor comprises two relatively movable substrates with electrical conductors and means for selectively energizing one of the conductors on each substrate to produce interacting magnetic fields which cause the substrates to assume predetermined positions relative to each other.

6 Claims, 9 Drawing Figures

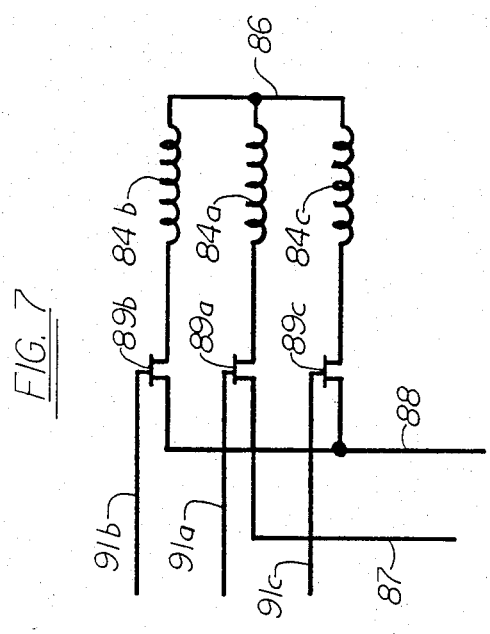

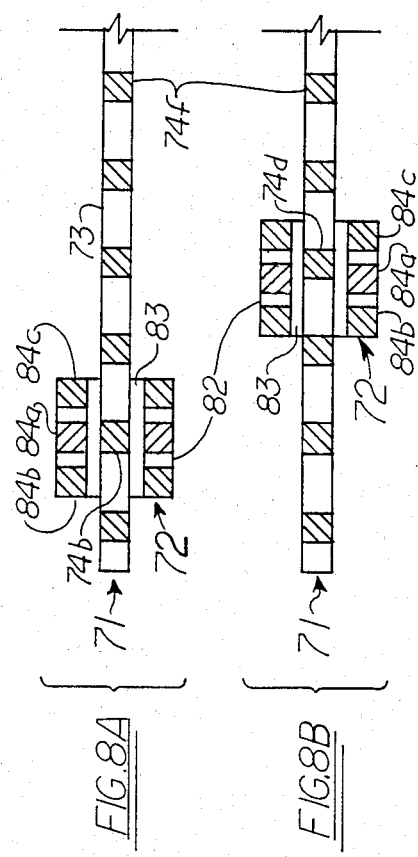

ELECTRONICALLY CONTROLLED MOTOR ASSEMBLY

This is a continuation-in-part of Ser. No. 417,222, filed Sept. 13, 1982.

This invention pertains generally to coils for use in electrical and electronic applications, and more particularly to a motor assembly in which the energization of individual windings is electronically controlled.

Coils or inductors are employed in a wide variety of electrical and electronic applications such as tuned circuits, transformers, and other devices employing a stationary or moving magnetic field. Such coils typically consist of a continuous length of electrically conductive wire or other suitable material wound about a core or other suitable form. Some coils are provided with taps or connections to one or more windings between their ends to permit different portions of the coil to be selectively energized or connected into a circuit. Other coils are provided with adjustable tuning slugs or adjustable taps to provide different amounts of inductance. Such coils tend to be relatively cumbersome and inflexible and not readily suitable for certain applications.

It is in general an object of the invention to provide a new and improved coil assembly for use in electrical and electronic applications.

Another object of the invention is to provide a coil assembly of the above character in which the energization of individual windings is electronically controlled to provide different inductances, turns ratios, and/or sequences of energization.

Another object of the invention is to provide a coil assembly of the above character which can be employed in a variety of different applications such as tuned circuits, transformers, motors and other devices requiring or utilizing a moving magnetic field.

Another object of the invention is to provide a coil assembly of the above character which can be constructed in microminiature form.

These and other objects are achieved in accordance with the invention by providing an electronically controlled coil assembly comprising a substrate, first and second electrically conductive buses on the substrate for connection to a source of electrical energy, and a plurality of conductors on the substrate connected electrically in parallel between the buses to form the windings of a coil. Control means carried by the substrate is connected electrically in series with individual ones of the conductors for selectively controlling energization of the conductors. In one embodiment, the assembly is constructed in microminiature form on a semiconductor substrate, and in another it is constructed on a circuit board.

FIGS. 6 and 7 are circuit diagrams of the motor of FIG. 5.

FIGS. 8A and 8B are schematic drawings illustrating operation of the motor of FIG. 5.

Figure 1:
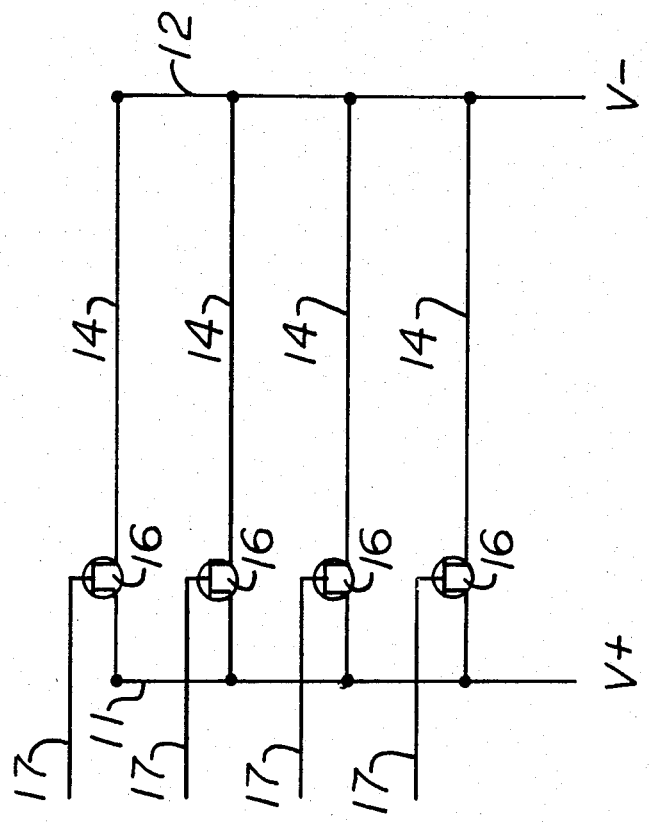
FIG. 1 is a block diagram of one embodiment of an electronically controlled coil assembly according to the invention.

As illustrated in FIG. 1, the coil assembly comprises a pair of electrically conductive buses 11, 12 which are connected to a source $(+V, -V)$ of electrical energy. A plurality of electrical conductors 14 are connected electrically in parallel between the buses to form the windings of a coil, and electronic control elements 16 are connected electrically in series with the individual conductors to control the energization thereof. In the embodiment illustrated, the control elements comprise field effect transistors, and control signals are applied to the control gates of the field effect transistors.

However, it will be understood that any other suitable control elements can be employed if desired. The conductors which form the coil windings are arranged in closely spaced parallel relationship on a suitable substrate, not shown in this figure, such as a printed circuit board or a semiconductor body. With a planar substrate, components of the magnetic field produced by energization of the coil assembly tend to cancel each other in a direction perpendicular to the plane of the windings and to reinforce each other in a direction parallel to this plane, resulting in generally planar fields parallel to the windings.

The number and manner in which the coil windings are energized or connected into a circuit is controlled by signals applied via control lines 17 to the control inputs of control elements 16. These elements can be turned or rendered conductive individually or in any desired group or groups and in any desired sequence by the application of suitable control signals.

Figure 2:
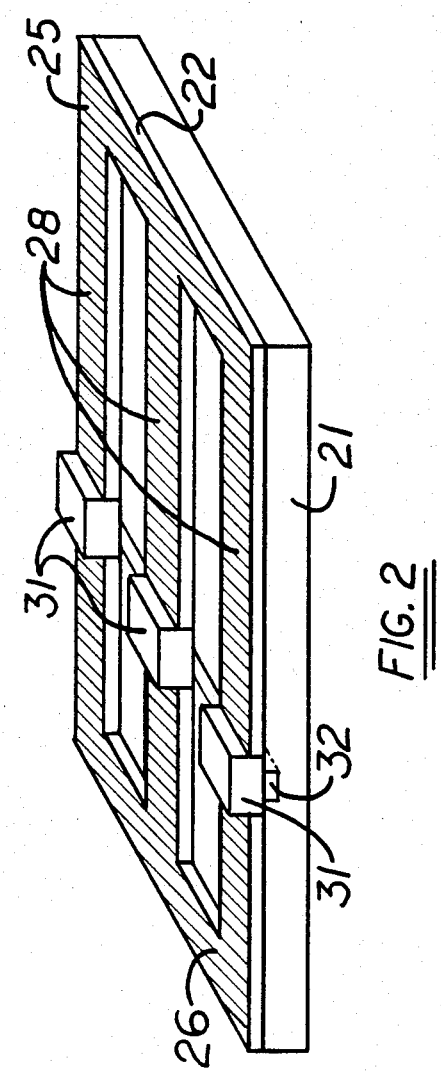
FIG. 2 is an isometric view, somewhat schematic, of one embodiment of a coil assembly incorporating the invention.

In the embodiment of FIG. 2, the substrate comprises a body 21 of semiconductor material having a generally planar upper surface 22. Buses 25, 26 are formed on this surface for connection to a source of electrical energy, and electrical conductors 28 extend between the buses in spaced parallel relation to form the windings of a coil. Control elements 31 such as field effect transistors are connected electrically in series with the coil windings to control the energization thereof, and control signals are applied to the control elements via control lines 32. In this embodiment, control elements 31 are formed by conventional techniques in the semiconductor body, and control lines 32, buses 25, 26 and conductors 27 are formed as metalization layers on the upper surface of the semiconductor body, with the control lines being positioned below and insulated from the coil windings. This embodiment can be constructed in microminiature form and mounted in a package of the type commonly employed for integrated circuits.

Figure 3:
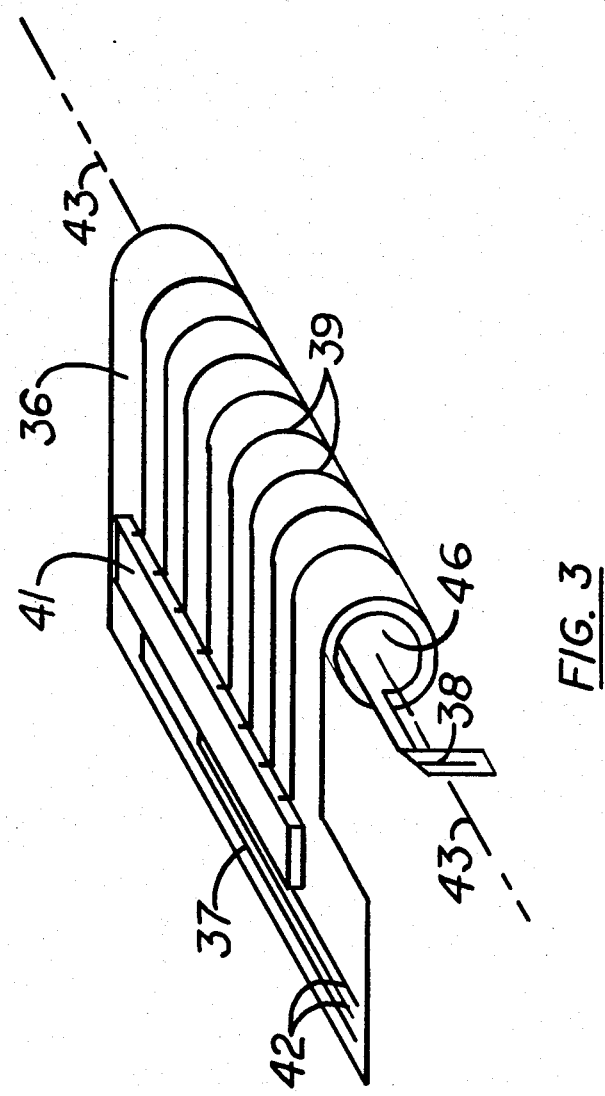
FIG. 3 is an isometric view, somewhat schematic, of a second embodiment of a coil assembly incorporating the invention.

FIG. 3 illustrates an embodiment of the invention which is particularly suitable for use in linear induction motors, loudspeaker coils, electron guns and other applications which require a moving magnetic field. This embodiment includes a substrate 36 which comprises a flexible, generally rectangular printed circuit board with electrically conductive buses 37, 38 extending in a lateral direction near the ends of the board for connection to a source of electrical energy. A plurality of electrical conductors 39 extend longitudinally of the board between the buses in spaced parallel relation to form the windings of a coil, and control elements 41 are connected electrically in series with the conductors toward one end of the board to control the energization of the windings. Control lines 42 extend laterally of the board and carry control signals to the control elements. In this embodiment, buses 37, 38, conductors 39 and control lines 42 are formed by a conductive metal foil on the flexible substrate.

Circuit board 36 is wrapped in spiral fashion about an axis 43 which extends in a direction generally perpendicular to the length of conductors 39, with the conductors encircling the axis and control elements 41 being positioned toward the outer end of the wrapped structure. In this embodiment, the magnetic field produced by the coil assembly is directed along axis 43 in the manner of a conventional helically wound coil, but the individual windings can be selectively energized to produce a magnetic field which moves along the axis in any desired manner. In an electron gun, for example, the coil windings can be energized sequentially from one side of the circuit board to the other to provide a magnetic field which travels along the axis.

As illustrated in phantom lines, a magnetically polarized armature 46 can be positioned within the wrapped coil assembly for movement along axis 43 in response to energization of the coil windings. The position of the armature and the manner in which it moves are determined by the manner in which the coil windings are energized, i.e., by the control signals applied to the control elements. Although illustrated schematically, armature 46 can be the armature member of a linear induction motor, the magnet of a loudspeaker, the armature of a solenoid, or the moveable member of any other suitable device.

Figure 4:
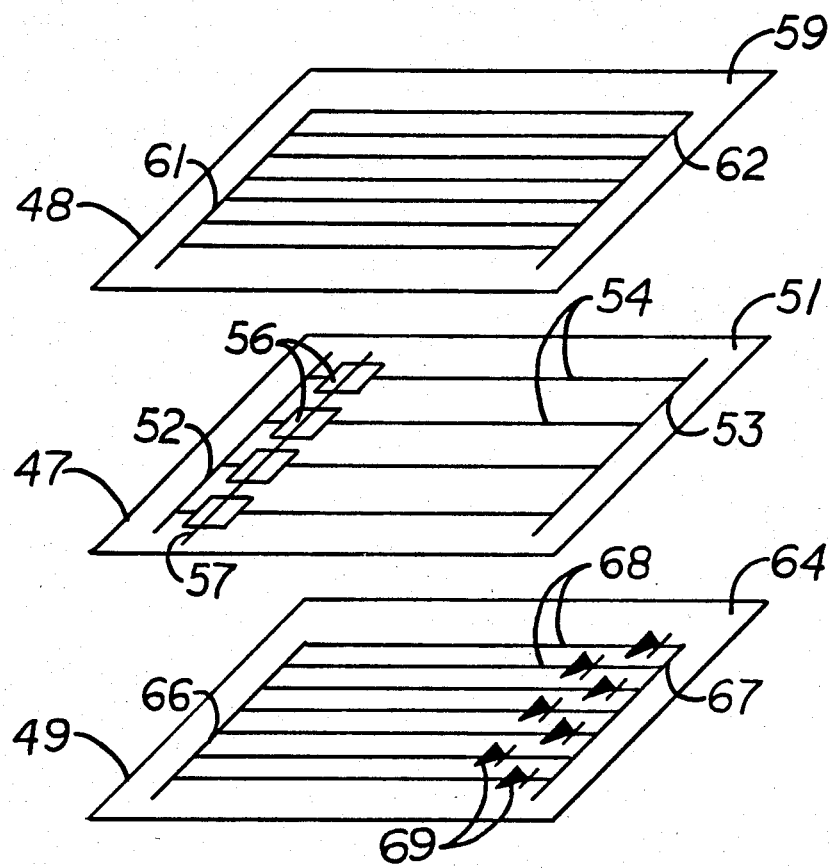
FIG. 4 is an exploded isometric view, somewhat schematic, of one embodiment of a transformer incorporating the coil assembly of the invention.

FIG. 4 illustrates the use of a coil assembly 47 of the type heretofore described in combination with a pair of secondary windings 48, 49 to form a transformer. In this embodiment, coil assembly 47 comprises a rectangular generally planar substrate 51 with buses 52, 53 positioned toward opposite ends thereof for connection to a source of electrical energy. Electrical conductors 54 extend between the buses in spaced parallel relationship, and control elements 56 are connected electrically in series with the conductors to control the energization thereof. Control signals are applied to the control elements by a control line 57, and coil assembly 47 serves as the primary winding of the transformer.

Secondary winding 48 comprises a rectangular generally planar substrate 59 which is spaced from and generally parallel to substrate 51. Output buses or conductors 61, 62 extend across the substrate toward opposite ends thereof, and a plurality of electrical conductors 62 are connected electrically in parallel between the output connectors to form the windings of the secondary. These conductors are arranged in spaced parallel relationship, and the secondary winding is oriented with conductors 62 parallel to conductors 54 and within the magnetic field produced by energization of conductors 54.

Secondary winding 49 is generally similar to winding 48, and it includes a substrate 64, output conductors 66, 67, and conductors 68 which form the windings of the secondary. In addition, winding 49 includes rectifying elements or diodes 69 connected electrically in series with conductors 68 whereby the current induced in this winding is rectified to provide a DC output current.

In the transformer of FIG. 4, the primary and secondary winding assemblies are conveniently constructed in the form of printed circuits, with the conductors and buses comprising electrically conductive foils on circuit boards. Alternatively, a transformer of this type can be constructed on a single circuit board with one or more secondary windings on the opposite side of the board from the primary winding. The number of conductors in the respective windings can be selected to provide the desired turns ratios, and further adjustment of the output voltages can be provided by controlling the number of primary windings which are energized.

FIGS. 5-8 illustrate the use of coil assemblies of the type heretofore described in a linear induction motor which is particularly suitable for use in precise positioning applications such as positioning the transducer head in a disk drive system. This motor comprises a first coil assembly 71 and a second coil assembly 72, with the two coil assemblies being moveable relative to each other. In a disk drive, for example, coil assembly 71 can be mounted in a fixed position, and the transducer head can be mounted on coil assembly 72 for movement between the tracks on the disk.

Coil assembly 71 includes an elongated substrate 73 on which a plurality of electrical conductors 74a-74n are formed. These conductors extend transversely of the substrate and can be spaced apart by a distance corresponding to the spacing between the tracks in the disk drive system. Thus, coil assembly 71 can be installed in a disk drive, with substrate 73 extending in a radial direction and conductors 74a-74n being aligned with the tracks on the disk. As illustrated, the conductors can be wrapped around the substrate in the manner heretofore described.

Figure 6:
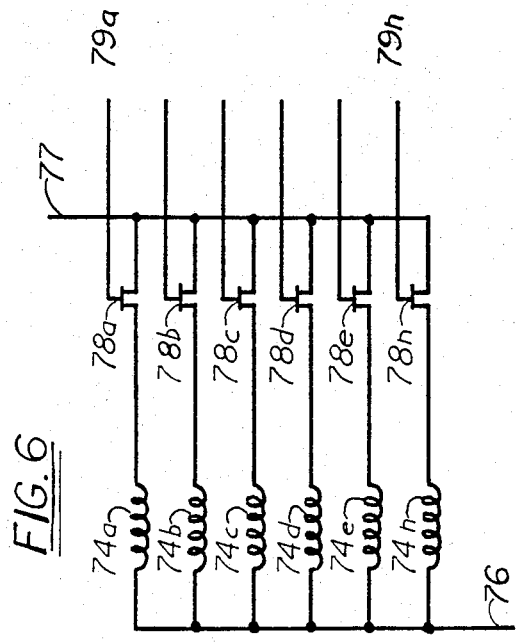

As illustrated in FIG. 6, one end of each of the conductors 74a-74n is connected to an electrically conductive bus 76 which is connected to ground. The other ends of the conductors are connected to a second electrically conductive bus 77 by control elements 78a-78n such as field effect transistors. Bus 77 is connected to the positive terminal (+V) of a voltage source, and control signals are applied to control elements 78a-78n via control lines 79a-79n to provide selective energization of the conductors. Buses 76, 77, control elements 78a-78n and control lines 79a-79n can all be formed on the substrate, and electrical connections to the elements are made by a cable 81.

Coil assembly 72 is moveable relative to coil assembly 71 and includes a substrate 82 having a generally rectangular opening 83 through which substrate 73 extends. Electrical conductors 84a-84c are carried by substrate 82 and extend generally around opening 83 in a direction parallel to conductors 74a-74n. Conductors 84a-84c are spaced side by side on the substrate, with conductor 84a in the middle and conductors 84b, 84c on opposite sides of the central conductor.

As illustrated in FIG. 7, one end of each of the conductors 84a-84c is connected to an electrically conductive bus 86. The other ends of conductors 84a-84c are connected to electrically conductive buses 87, 88 by control elements 89a-89c such as field effect transistors. Bus 87 is connected to the positive terminal (+V) of a voltage source, and bus 88 is connected to the negative terminal (−V) of the source. Control signals are applied to control elements 89a-89c by control lines 91a-91c to control the energization of conductors 84a-84c. Buses 86, 87 and 88, control elements 89a-89c, and control lines 91a-91c are all formed on substrate 82, and connections to these elements are made by a cable 92.

Figure 5:
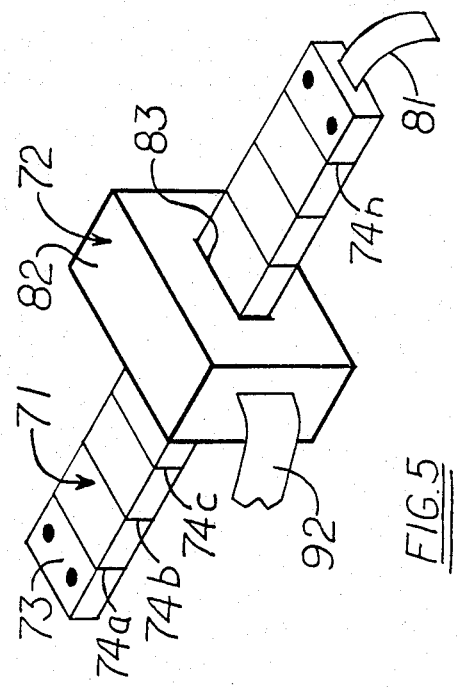
FIG. 5 is an isometric view of one embodiment of a motor incorporating the coil assembly of the invention.

Operation and use of the motor of FIG. 5 is best understood with reference to FIGS. 8A and 8B. It is assumed that the motor is installed in a disk drive assembly with the conductors of coil assembly 71 aligned with the tracks on the disk, and the transducer head connected to coil assembly 72 for movement between the tracks. Control signals are applied to control lines 79a–79n to turn on one of the control elements 78a–78n and thereby energize the conductor 74a–74n associated with the track where the head is to be positioned. In the illustration of FIG. 8A, it is assumed that conductor 74b is energized.

The central conductor 84a of coil assembly 72 is energized with a current which produces a magnetic field of the opposite sense to the field produced by energization of conductors 74a–74n. These fields therefore interact in a mutually attractive mode which tends to align conductor 84a with the energized conductor of coil assembly 71, e.g. conductor 74b in FIG. 8A.

Outer conductors 84b, 84c are energized with a current of opposite polarity to the current which energizes central conductor 84a. Therefore, the magnetic field produced by energization of outer conductors 84b, 84c interacts with the field produced by conductors 74a–n in a mutually repulsive manner. By adjusting the relative levels of the energizing currents in conductors 84a–84c, the position of coil assembly 72 can be adjusted about the energized conductor of coil assembly 71. This adjustment is controlled by the signals applied to control lines 91a–91c. In the example of FIG. 8A, equal currents are applied to outer conductors 84b, 84c, and conductor 84a is positioned in direct alignment with conductor 74b. In the example of FIG. 8B, stationary conductor 74d is energized, and outer conductor 84b is energized with a larger current than outer conductor 84c. Central conductor 84a is thus displaced from conductor 74d in the direction of the outer conductor with the larger energizing current, i.e., conductor 84b in this example.

Thus, the selective energization of windings 74a–74n provides a coarse adjustment of the head position, and the energization of windings 84a–84c provides a finer adjustment of the head position.

It is apparent from the foregoing that a new and improved electronically controlled coil assembly has been provided. While only certain presently preferred embodiments have been described, as will be apparent to those familiar with the art, certain changes and modifications can be made without departing from the scope of the invention as defined by the following claims.

I claim:

1. In an electronically controlled motor assembly: first and second relatively moveable substrate members, a plurality of spaced apart electrical conductors carried by the first substrate member, an electrical conductor carried by the second substrate member and extending in a direction generally parallel to the conductors carried by the first substrate member, and means for selectively energizing one of the conductors carried by the first substrate member and the conductor carried by the second substrate member to produce interacting magnetic fields which cause the substrate members to assume a predetermined position relative to each other.

2. The motor assembly of claim 1 including an additional electrical conductor carried by the second substrate member, and means for energizing the additional conductor to produce an additional magnetic field for adjusting the relative positions of the substrate members about the predetermined position.

3. The motor assembly of claim 2 wherein a second additional conductor is also carried by the second substrate member, and the first named conductor carried by the second substrate member is positioned between the additional conductors, the first named conductor and the additional conductors being energized with currents of opposite senses.

4. The motor assembly of claim 3 wherein the conductor carried by the first substrate member and the first named conductor carried by the second substrate member are energized with currents of opposite senses which produce mutually attractive magnetic forces, and the additional pair of conductors are energized with a current of the same sense as the current applied to the conductors carried by the first substrate member so that the magnetic fields associated with these conductors are mutually repulsive.

5. In an electronically controlled motor assembly: first and second relatively moveable substrate members, a plurality of spaced apart generally parallel electrical conductors carried by the first substrate member, means including electronic control elements carried by the first substrate member for interconnecting the conductors with a source of electrical energy for selective energization of said conductors to produce a magnetic field of predetermined sense about a selected one of the conductors, a first electrical conductor carried by the second substrate member and extending in a direction generally parallel to the conductor carried by the first substrate member, additional electrical conductors carried by the second substrate member and spaced a predetermined distance from the first conductor on opposite sides thereof, means connecting the first conductor and the additional conductors together electrically at one end thereof, and means including electronically controlled switching elements carried by the second substrate member and interconnecting the other ends of the first conductor and the additional conductors respectively with opposite terminals of a source of electrical energy to produce controlled magnetic fields of opposite senses around the first conductor and the additional conductors, said fields interacting with the field around the energized conductor of the first substrate member to determine the relative positions of the substrate members.

6. The motor assembly of claim 5 wherein the magnetic fields produced by the energized conductor of the first substrate member and the first conductor of the second substrate member are mutually attractive, and the magnetic fields produced by the energized conductor of the first substrate member and the additional conductors of the second substrate member are mutually repulsive.

* * * * *